UNITED STATES PATENT OFFICE.

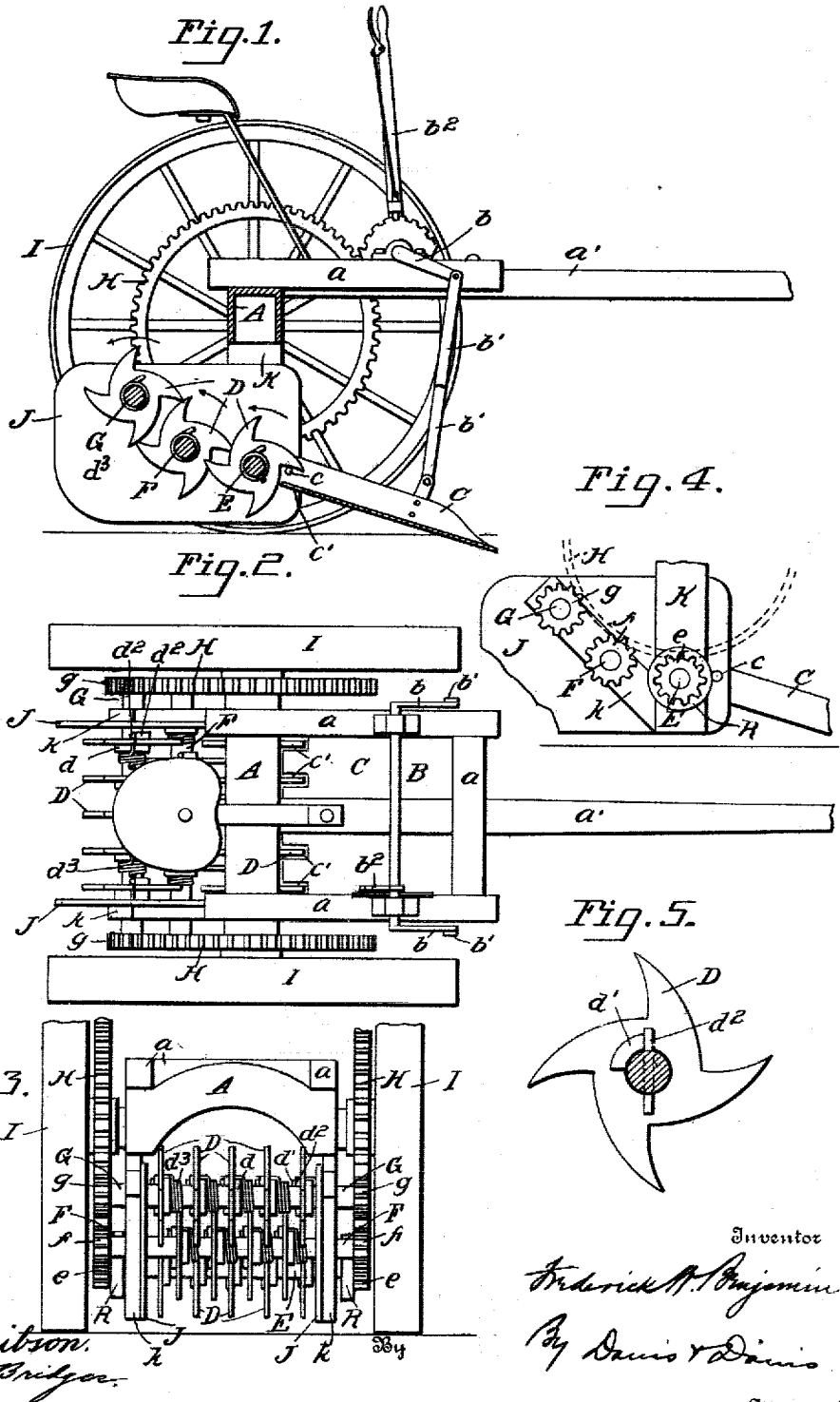

FREDERICK W. BENJAMIN, OF JEFFERSON, OHIO.

POTATO-DIGGER.

No. 814,346.   Specification of Letters Patent.   Patented March 6, 1906.

Application filed December 19, 1905. Serial No. 292,482.

*To all whom it may concern:*

Be it known that I, FREDERICK W. BENJAMIN, a citizen of the United States of America, and a resident of Jefferson, county of Ashtabula, State of Ohio, have invented certain new and useful Improvements in Potato-Diggers, of which the following is a full and clear specification, reference being had to the accompanying drawings, in which—

Figure 1 is a vertical longitudinal section of my improved machine; Fig. 2, a plan thereof; Fig. 3, a rear elevation thereof; Fig. 4, a detail side elevation showing more particularly the gearing; and Fig. 5, a detail view of one of the soil-pulverizing wheels, showing the opposite side from that seen in Fig. 1.

The object of this invention is to provide a simple and efficient machine whereby the potatoes, together with the immediately surrounding soil, will be scooped up as the machine advances and delivered to an agitating or sifting mechanism, which will loosen and separate the soil from the potatoes and deliver the potatoes at the rear of the machine on top of the ground, where they may be conveniently picked up by hand, as more fully hereinafter set forth.

To the accomplishment of this object and such others as may hereinafter appear the invention consists of the parts and combination of parts hereinafter fully described, and particularly pointed out in the appended claims, reference being had to the accompanying drawings, forming a part of this specification, in which the same reference characters designate like parts throughout the several views.

Referrring to the drawings annexed by reference characters, A designates the axle, upon which is mounted a frame consisting of the beams $a$. The tongue $a'$ is attached to this frame and the axle, and upon the tongue of the frame is mounted a driver's seat.

The transporting means I are each provided on its inner side with a large spur-gear H, which meshes with a series of pinions $e, f,$ and $g$, these pinions being rigidly secured, respectively, to the transverse shafts E, F, and G, these shafts being suitably journaled in frames depending from the axle and consisting of beams K and $k$. The shaft E is in front and is arranged about coincident with the axle, and the other shafts are arranged behind it in an ascending series. Each shaft is provided with a series of agitating or stirrer wheels D, provided with radial teeth or cams, whose rear faces are convexed. The teeth of the adjacent series overlap, thereby forming a grate-like screen. Guard-plates J are arranged at each side of the machine to hold the soil on the agitating-wheels and to prevent it interfering with the gearing. A scoop C is pivoted at $c$ to the forward edges of the guard-plates, and its rear edge is notched for the reception of the teeth of the front set of stirrer-wheels, so that the rear edge of the scoop is brought nearer to the front shaft. The front end of the scoop is raised and lowered by means of depending links $b'$, pivotally connecting the side edges of the scoop with crank-arms $b$, carried by a rock-shaft B, which rock-shaft is rocked in its bearings to raise or lower the scoop by means of an upstanding lever $b^2$, combined with which is a segment of the usual construction.

It will be observed that when the machine is drawn along with the plow-scoop down the potato-bearing soil is scooped up and delivered to the agitating-wheels, and as these wheels are caused to rotate simultaneously backwardly the soil will be broken up and moved backwardly. In passing over the wheels the soil will be sufficiently broken up to fall down between them to the ground, and the separated potatoes are delivered off the rear series of wheels and dropped on the surface of the ground. Each of the wheels D has a limited rotary movement on its shaft, this movement being limited by a lug $d'$ striking against a projection or pin $d^2$, carried by the shaft, and this movement is made resilient by means of coil-springs $d^3$. Each of these springs $d^3$ has one end fastened to the shaft and its other end to the wheel, so as to normally turn the wheel rearwardly and hold it normally with its lug $d'$ against pin $d^2$. With this spring arrangement it will be observed that should the convex surfaces of the teeth strike an unyielding obstacle, such as a large stone, the wheels will yield sufficiently to prevent breaking the teeth or the pinions or disturbing the shaft-bearings.

It will be observed that a greater number of the agitating-shafts may be employed, if found desirable, and also that it is possible to employ but one set of gearing at one side of the machine for operating the shafts.

It will also be observed that suitable ratchet devices may be employed on the shaft E or upon the main axle in order to permit the machine to back and turn without injuring the driving mechanism. In the drawings, R indicates the casing for this ratchet mechanism when it is carried by the shaft E.

What I claim, and desire to secure by Letters Patent, is—

1. In a machine of the class described, the combination of a frame mounted on transporting-wheels, a gear carried by one of the wheels, a series of transverse shafts carrying resilient overlapping agitating-teeth, guard-plates, a plow-scoop in front of said series of agitating-teeth, and means for raising and lowering the plow-scoop.

2. In combination with a frame mounted on wheels, guard boards or plates, a series of transverse shafts extending across the space between said guard-boards and each being provided with a series of wheels having radial teeth whose rear faces are convexed, means whereby these wheels have a limited rotary motion forwardly on their respective shafts, gearing for rotating said shafts backwardly, and a vertically-adjustable scoop arranged in front of said shafts, substantially as set forth.

In testimony whereof I hereunto affix my signature, in the presence of two witnesses, this 4th day of December, 1905.

FREDERICK W. BENJAMIN.

Witnesses:
ALVIN C. WHITE,
HOMER ANDREWS.